United States Patent
Arya et al.

(10) Patent No.: US 10,007,285 B2
(45) Date of Patent: Jun. 26, 2018

(54) INJECTING ELECTRICITY INTO A GRID FROM DISTRIBUTED GENERATION

(71) Applicants: International Business Machines Corporation, Armonk, NY (US); Universiti Brunei Darussalam, Brunei Darussalam (BN)

(72) Inventors: Vijay Arya, Bangalore (IN); Tanuja Hrishikesh Ganu, Bangalore (IN); Shivkumar Kalyanaraman, Bangalore (IN); Jimmy Lim Chee Ming, Sengkurong (BN); Devasenapathi Periagraharam Seetharamakrishnan, Bangalore (IN)

(73) Assignees: International Business Machines Corporation, Armonk, NY (US); Universiti Brunei Darussalam (BN)

( * ) Notice: Subject to any disclaimer, the term of this patent is extended or adjusted under 35 U.S.C. 154(b) by 573 days.

(21) Appl. No.: 14/178,818

(22) Filed: Feb. 12, 2014

(65) Prior Publication Data
US 2015/0227124 A1 Aug. 13, 2015

(51) Int. Cl.
G05F 1/66 (2006.01)
H02J 3/32 (2006.01)
(Continued)

(52) U.S. Cl.
CPC ............... G05F 1/66 (2013.01); H02J 3/32 (2013.01); H02J 3/382 (2013.01); H02J 3/385 (2013.01);
(Continued)

(58) Field of Classification Search
None
See application file for complete search history.

(56) References Cited

U.S. PATENT DOCUMENTS 7,508,173 B2   3/2009   Zhou et al.
7,663,348 B2   2/2010   Oohara et al.
(Continued)

FOREIGN PATENT DOCUMENTS

EP      1887674 A1      2/2008
WO   WO2013015773 A1   1/2013

OTHER PUBLICATIONS

Alam, M.J.E., et al., "Distributed energy storage for mitigation of voltage-rise impact caused by rooftop solar PV," Power and Energy Society General Meeting, Jul. 22-26, 2012, 10 pages, San Diego, California, United States, IEEE Digital Library.
(Continued)

Primary Examiner — Eric C Wai
(74) Attorney, Agent, or Firm — Ference & Associates LLC

(57) ABSTRACT

Methods and arrangements for managing electricity generation in a distributed electricity generation system. A plurality of data inputs are received comprising: a sensed state of a power grid; a sensed state of local energy storage; and a sensed demand of a local electricity load. The data inputs are combined, and, based on the combined data inputs, there is determined a destination of electricity that is generated in the distributed electricity generation system. The at least one destination is selected from the group consisting of: a local electricity load, the power grid, and the local energy storage. Other variants and embodiments are broadly contemplated herein.

20 Claims, 5 Drawing Sheets

(51) Int. Cl.
| | |
|---|---|
| H02J 3/38 | (2006.01) |
| H02J 7/35 | (2006.01) |
| H02J 13/00 | (2006.01) |
| H02J 3/00 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl.
CPC .............. *H02J 3/008* (2013.01); *H02J 7/35* (2013.01); *H02J 13/0062* (2013.01); *Y02E 10/58* (2013.01); *Y02E 40/72* (2013.01); *Y02E 60/722* (2013.01); *Y02E 60/7838* (2013.01); *Y02E 70/30* (2013.01); *Y04S 10/123* (2013.01); *Y04S 10/14* (2013.01); *Y04S 40/124* (2013.01); *Y04S 50/10* (2013.01)

(56) References Cited

U.S. PATENT DOCUMENTS

| | | | |
|---|---|---|---|
| 8,265,798 | B2 | 9/2012 | Imes |
| 8,552,590 | B2 | 10/2013 | Moon et al. |
| 2009/0027002 | A1 | 1/2009 | Stahlkopf |
| 2012/0205981 | A1 | 8/2012 | Varma et al. |
| 2012/0233094 | A1* | 9/2012 | Mise ............... G06Q 30/06 705/412 |
| 2012/0280673 | A1 | 11/2012 | Watanabe et al. |
| 2014/0312882 | A1* | 10/2014 | Dong ............... G01R 31/42 324/76.53 |

OTHER PUBLICATIONS

Caples, Donal, et al., "Impact of Distributed Generation on Voltage Profile in 38kV Distribution System," 8th International Conference on the European Energy Market (EEM), May 25-27, 2011, pp. 532-536, Zagreb, Croatia, IEEE Digital Library.

Mackay, David J.C., "Illuminating the Future of Energy," The New York Times, Aug. 28, 2009, 3 pages, New York, United States, URL: www.nytimes.com/2009/08/29/business/energy-environment/29iht-sustain.html?_r=1&, Accessed Jan. 9, 2014.

Perez, Richard, "Lead-Acid Battery State of Charge vs. Voltage," Home Power Magazine, Aug./Sep. 1993, 5 pages, vol./Issue No. 36, Ashland, Oregon, United States, URL:www.scubaengineer.com/documents/lead_acid_battery_charging_graphs.pdf, Accessed Jan. 9, 2014.

Mahmud, M.A., et al, "Analysis of Voltage Rise Effect on Distribution Network with Distributed Generation," 18th World Congress of the International Federation of Automatic Control (IFAC), Aug. 28-Sep. 2, 2011, Milano, Italy, pp. 14796-14801, URL:seit.unsw.adfa.edu.au/staff/sites/hrp/papers/mhp11a-c.pdf, Accessed Jan. 9, 2014.

Lovins, Amory B., "Small is Profitable—The Hidden Economic Benefits of Making Electrical Resources the Right Size," 1st Edition, Editor: Beatrice Aranow, 2002, cover page provided, Rocky Mountain Institute, Snowmass, Colorado, United States, Full copy can be obtained atlibrary.uniteddiversity.coop/Money_and_Economics/Small-is-Profitable.pdf, Accessed Jan. 9, 2014.

Skinner, Jo, "Energy Minister Mark McArdle says Qld Government won't reduce solar feed-in tariff," On-line Article, Jun. 5, 2013, 2 pages, URL:www.abc.net.au/news/2013-06-05/qld-government-wont-reduce-solar-feed-in-tariff/4734902, Accessed Jan. 9, 2014.

Townsville Queensland Solar City, Project Overview, 1 page, Website can be accessed atwww.townsvillesolarcity.com/au/ProjectOverview/tabid/64/Default.aspx, Accessed Jan. 9, 2014.

Hepworth, Annabel, "Rooftop solar panels overloading electricity grid," The Australian, Australia, Oct. 13, 2011, 3 pages, URL: www.theaustralian.com.au/news/rooftop-solar-panels-overloading-electricity-grid/story-e6frg6n6-1226165360822, Accessed Jan. 9, 2014.

Sansawatt, Thipnatee, et al., "Integrating Distributed Generation Using Decentralised Voltage Regulation," Power and Energy Society General Meeting, Jul. 25-29, 2010, 6 pages, Minneapolis, Minnesota, United States, IEEE Digital Library.

Ganu, Tanuja, et al., "nPlug: An Autonomous Peak Load Controller," IEEE Journal on Selected Areas in Communications, Jul. 2013, 14 pages, vol. 31, No. 7, IEEE Digital Library.

* cited by examiner

| DES Availa-bility? | Grid Voltage (V) | Battery SoC | Feed-in-tariff >= consumption pricing ? | Local Energy Reqts. | Action |
|---|---|---|---|---|---|
| Yes | NC | NC | No | Yes | Power the local loads using local energy. |
| Yes | NC | Low | No | No | Charge the battery using local energy. |
| Yes | High ($V_{ci} > V_H$) for all 3 phases | High | NC | No | Disconnect the source. |
| Yes | Low ($V_{ci} = 0$) for all three phases | NC | NC | NC | Power the local loads using local energy (could be a simple way to handle anti-islanding) and disconnect from the grid. This action can also be taken if a fire sensor is available and detects fire or smoke. |
| Yes | Medium ($V_{ci} < V_H$) and $V_{ci} = 0$ for any of the phases i | High | No | No | Inject all locally generated energy into the grid into appropriate phases proportional to their voltages using GSMA (grid sense multiple access) technique. |
| Yes | Medium ($V_{ci} < V_H$) and $V_{ci} = 0$ for any of the phases i | NC | Yes | NC | Inject all generated energy into the grid into appropriate phases proportional to their voltages using GSMA technique. |
| Yes | High or Medium for any of the phases i | Low | Yes | NC | Inject all locally generated energy into the grid into appropriate phase using GSMA technique and charge the battery/power local loads from the grid. |
| No | High ($V_{ci} > V_H$) for all 3 phases | Low | Yes | NC | Charge battery from grid. |
| No | Medium ($V_{ci} < V_H$) and $V_{ci} = 0$ for any of the phases i | High | Yes | NC | Inject energy from battery into appropriate phase of the grid, proportional to their voltages using GSMA technique. |
| No | Low ($V_{ci} = 0$) for all three phases | High | NC | Yes | Power the local loads using battery and disconnect from grid. |

INJECTING ELECTRICITY INTO A GRID FROM DISTRIBUTED GENERATION

BACKGROUND

Generally, distributed generation has been found to have several benefits. However, several problems are notable. Peaks in electricity demand do not follow peaks in solar generation efficiency, resulting in residential solar units feeding power into the grid when it is not needed. An imbalance in the deployment of single-phase solar generation capacity across the phases running from a single upstream transformer creates a load imbalance on that transformer. Other problems have also been noted.

BRIEF SUMMARY

In summary, one aspect of the invention provides a method of managing electricity generation in a distributed electricity generation system, the method comprising: receiving a plurality of data inputs comprising: a sensed state of a power grid; a sensed state of local energy storage; and a sensed demand of a local electricity load; combining the data inputs; and based on the combined data inputs, determining a destination of electricity that is generated in the distributed electricity generation system; wherein the at least one destination is selected from the group consisting of: a local electricity load, the power grid, and the local energy storage.

Another aspect of the invention provides an apparatus for managing electricity generation in a distributed electricity generation system, the apparatus comprising: at least one processor; and a computer readable storage medium having computer readable program code embodied therewith and executable by the at least one processor, the computer readable program code comprising: computer readable program code configured to receive a plurality of data inputs comprising: a sensed state of a power grid; a sensed state of local energy storage; and a sensed demand of a local electricity load; computer readable program code configured to combine the data inputs; and computer readable program code configured, based on the combined data inputs, to determine a destination of electricity that is generated in the distributed electricity generation system; wherein the at least one destination is selected from the group consisting of: a local electricity load, the power grid, and the local energy storage.

An additional aspect of the invention provides a computer program product for managing electricity generation in a distributed electricity generation system, the computer program product comprising: a computer readable storage medium having computer readable program code embodied therewith, the computer readable program code comprising: computer readable program code configured to receive a plurality of data inputs comprising: a sensed state of a power grid; a sensed state of local energy storage; and a sensed demand of a local electricity load; computer readable program code configured to combine the data inputs; and computer readable program code configured, based on the combined data inputs, to determine a destination of electricity that is generated in the distributed electricity generation system; wherein the at least one destination is selected from the group consisting of: a local electricity load, the power grid, and the local energy storage.

A further aspect of the invention provides a method comprising: sensing (i) a state of a power grid, (ii) a state of local energy storage, (iii) demand of a local electricity load, and (iv) electricity pricing information; the sensed state of the power grid including at least one of: sensed grid frequency and sensed grid voltage; deriving data from the sensing of (i), (ii), (iii), (iv), and combining the derived data; receiving the derived data at a regulator of a local electricity network; and based on the derived data, determining a destination of electricity that is generated in distributed electricity generation; wherein the at least one destination is selected from the group consisting of: a local electricity load, the power grid, and the local energy storage.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides a table showing an illustrative example of optimal management of local energy.

DETAILED DESCRIPTION

Figure 1:
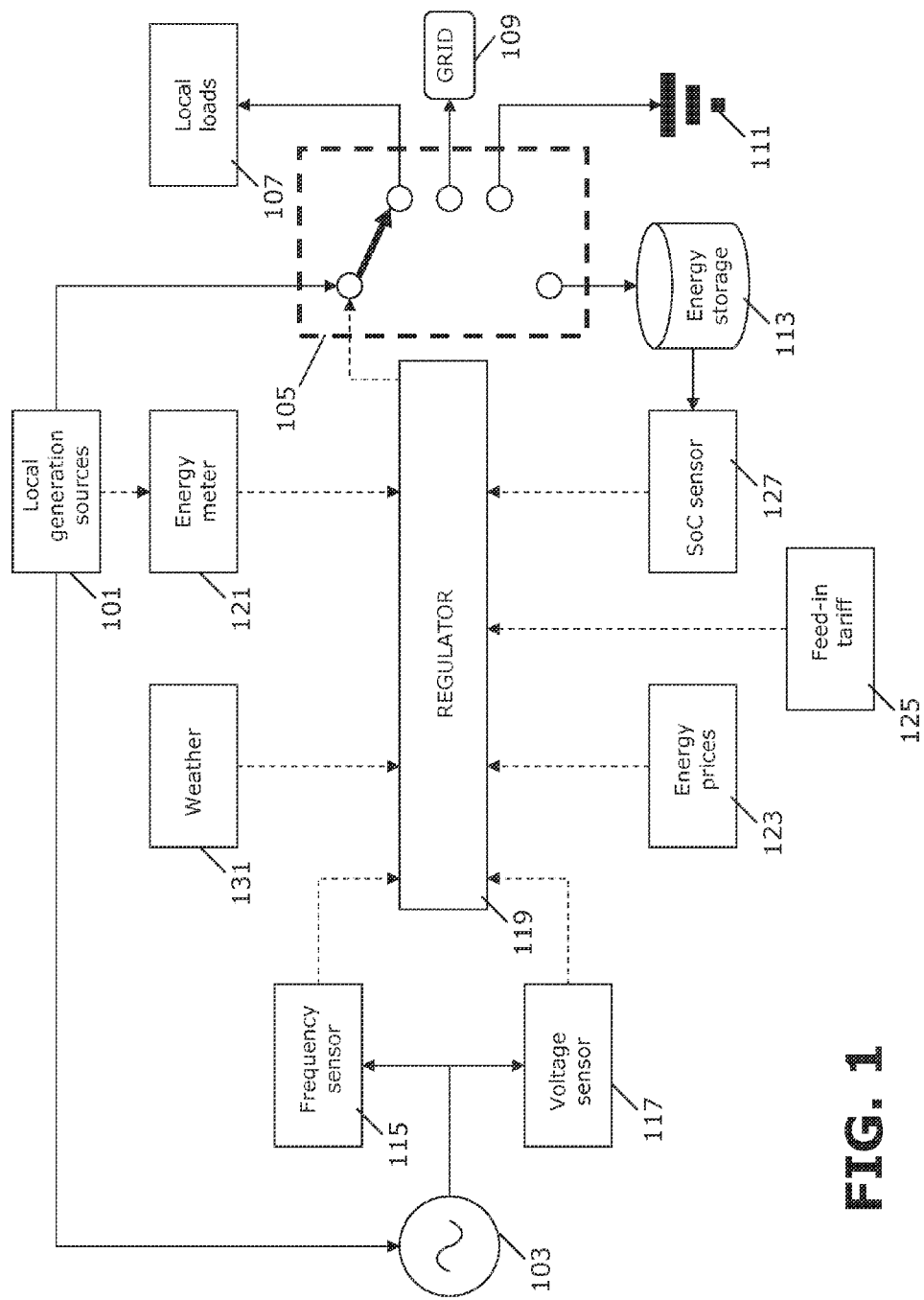
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which resolve conventional problems with distributed electricity generation. Overvoltage and anti-islanding problems can be avoided, and phase imbalance due to single phase electricity injection can be reduced. No communication infrastructure is needed, nor any changes to the generation sources or grid.

It is recognized, in accordance with at least one embodiment of the invention, that there can be occasional communication with the grid to incorporate feed-in-tariff or time-of-use pricing information. A feed-in tariff, or FIT, commonly relates to policies where eligible renewable electricity generators are paid a cost-based price for renewable electricity that ends up being supplied to a grid. Time-of-use pricing relates to variable pricing for electricity that ties to a time, e.g., time of day, that electricity is delivered. Additionally, energy supply companies [ESCOs] or demand aggregators, instead of utility companies, can coordinate with one or more components broadly contemplated herein, via providing a communication signal to inject electricity into the grid at times such as peak times, or via increasing demand from consumers during off-peak times.

In accordance with at least one embodiment of the invention, with faster sampling and a decentralized solution, a system can take quick local decisions for safety and precaution (e.g., immediate disconnect in case of fire, islanding etc.). The term "local", as employed herein, can refer to a region or structure connected to a power grid that involves power consumption solely by one or a limited number of entities. Thus, a "local" structure or region could be embodied (for example) by a single-family home, an apartment complex, a telecom tower or a commercial building.

FIG. 1 schematically illustrates a system architecture, in accordance with at least one embodiment of the invention. Data flows are shown with dotted arrows, and power flows with solid arrows. As shown, local generation sources 101 (such as local solar or wind power sources) feed into AC mains 103 and, via a selector switch 105, to any of: local loads 107, the general grid 109 and ground 111. Optionally, selector switch 105 can also send power from local sources 101 to energy storage 113 (e.g., battery storage). The state of the AC mains 103 is sensed by a frequency sensor 115 and voltage sensor 117. Data from sensors 115 and 117 are provided to regulator 119, along with data from an energy meter 121 associated with local sources 101. Optionally, weather data (131) may also be input into regulator 119 in suitable manner. In a manner to be appreciated more fully below, regulator 119 operates as an optimization engine for delivering power to any of several destinations via switch 105.

As such, in accordance with at least one embodiment of the invention, regulator 119 can also receive data relative to current (time of use) energy prices (123), a feed-in tariff (125) and the state of charge (SoC) of energy storage 113, as measured or sensed by a sensor 127. Data from regulator 119 can also be sent to selector switch 105, to regulate or assist in regulation of action of the switch 105. (Embodiments are also contemplated herein where the regulator 119 merely supplies data but then a final determination as to a subsequent destination of power is made via additional inputs and/or manual intervention or override.)

In accordance with at least one embodiment of the invention, among the advantages of methods and arrangements broadly contemplated herein are simplicity, wherein no setup is required at the customer end. A system is inexpensive for end consumer use, and is generic in that it can manage any local energy source (renewables, non-renewables etc.). A system can determine the optimal time to inject the energy/charge the batteries/power the local loads.

In accordance with at least one embodiment of the invention, voltage sensor 117 measures line voltage as an indicator of grid load. Here, line voltage is sensed by measuring voltage across a resistive divider (built with 1% tolerance resistors) between phase and neutral. The divider is sized in such a way that the dynamic range of microcontroller's 10-bit Analog to Digital Converter (ADC) can handle the entire input voltage range (110 V-350 V).

In accordance with at least one embodiment of the invention, SoC sensor 127 measures the state of charge of energy storage (e.g., storage battery) 113 in any suitable manner. If energy storage 113 is embodied by one or more lead acid or lithium ion batteries, remaining capacity of the battery/batteries could be inferred using terminal voltage.

FIG. 2 sets forth a table illustrating a manner of management via regulator 119 and selector switch 105, in accordance with at least one embodiment of the invention. (Continued, simultaneous reference may be made to FIG. 1.) The conditions and actions set forth in the table of FIG. 2 are provided by way of illustrative example, and are not intended to be restrictive. (For instance, also broadly contemplated herein as an alternative is the use of optimization techniques for making regulator decisions.)

Input conditions in the example of FIG. 2 are: DES (distributed energy source) availability (e.g., as may be provided by local generation source[s] 101); grid voltage (as sensed by sensor 117); SoC of energy storage (or battery) 113 (and as sensed by sensor 127); feed-in tariff (125) and consumption pricing (123) information (and, particularly, whether the former is greater than or equal to the latter); and local energy requirements (e.g., "yes" or "no"). (Local energy requirements can be input or determined via any suitable manner; by way of example, they can be determined by voltage pattern learning, as sensed and learned via one or more components as broadly contemplated herein.) Based on these input conditions (where "NC" conveys "not considered"), different actions are determined as shown in the rightmost column.

Generally, in accordance with at least one embodiment of the invention, in a probabilistic GSMA (grid sense multiple access) technique for injecting energy into the grid 109, let $V_{ci}$ represent the current moving average of line voltage on phase i observed over fixed window length. Let $V_L$ and $V_H$ represent the voltage lower and upper bound, respectively, calculated by using adaptive learning on past voltage sensed history. The probability of injecting into the phase i, $P_i$, is then calculated as:

$$P_i = ((V_{ci} - V_L)/(V_H - V_L)) \text{ if } V_L < V_{ci} < V_H \quad \text{(Normal grid load condition)}$$

$$= 1 \quad \text{if } V_{ci} < V_L \quad \text{(High grid load condition)}$$

$$= 0 \quad \text{if } V_H < V_{ci} \quad \text{(Low grid load condition)}$$

The probability of injection into each phase i is then normalized as:

$$PN_i = P_i/(P_1 + P_2 + P_3)$$

Then, a uniform random number, p, is generated in the range [0,1]. The phase for injecting generated electricity is decided as follows:

If $PN_1 = PN_2 = PN_3 = 0$ (Do not inject)

Else If $p <= PN_1$ (Select phase 1)

Else If $p <= PN_1 + PN_2$ (Select phase 2)

Else If $p <= PN_1 + PN_2 + PN_3$ (Select phase 3)

As initially mentioned above, this technique could be extended to incorporate feed-in-tariff (125) and/or time-of-use pricing (123) information for making optimal decisions.

Optionally, in accordance with at least one embodiment of the invention, predictive analytics and optimization can be employed. Here, if the weather (131), feed-in-tariff (125), time of use pricing (123) and/or other context information is available to regulator 119, it can predict the availability of DES, load requirements and whether are any grid outages might be likely, etc. Based on these predictions, the regulator 119 can choose to supply generated electricity to grid 109, storage 113 or local loads 107 optimally. In this case, a regulator 119 as broadly contemplated herein would use an occasional "in" communication (i.e., unidirectional incoming communication from a source such as a utility company or ESCO) to get the context information, which would be inexpensive.

Generally, there is broadly contemplated herein, in accordance with at least one embodiment of the invention, a system and methodology for optimal absorption of energy from distributed energy resources, via sensing the state of a grid, sensing needs of local loads and sensing a state of local storage. There may also be taken into consideration feed-in tariffs and time-of-use pricing. Further, there may be taken into consideration schedules of energy injection, storage and consumption that can be configured by an end user. Additionally, energy sources can be managed in accordance with any standing regulations.

In accordance with at least one embodiment of the invention, sensing the state of a grid can include sensing grid line frequency, the magnitude of grid line voltage and grid line phase angle. There can be learned, adaptively, a safe range of voltage and frequency for probabilistically determining safe thresholds of line voltage and frequency.

In accordance with at least one embodiment of the invention, sensing the needs of local loads can include measuring historical or present local consumption, and predicting future local consumption needs. Input may be obtained from an end user with regard to such future local needs.

In accordance with at least one embodiment of the invention, sensing a state of local storage can include measuring storage battery terminal voltage and computing a battery state of charge (SoC) based on the measured terminal voltage.

In accordance with at least one embodiment of the invention, schedules configurable by an end user can involve user preferences for time-based schedules of energy injection, storage and consumption. Management of energy sources in accordance with standing (e.g., governmental, municipal) regulations can include the use of configurable parameters that incorporate regulations that, e.g., may be based on tariff and policy.

Figure 3:
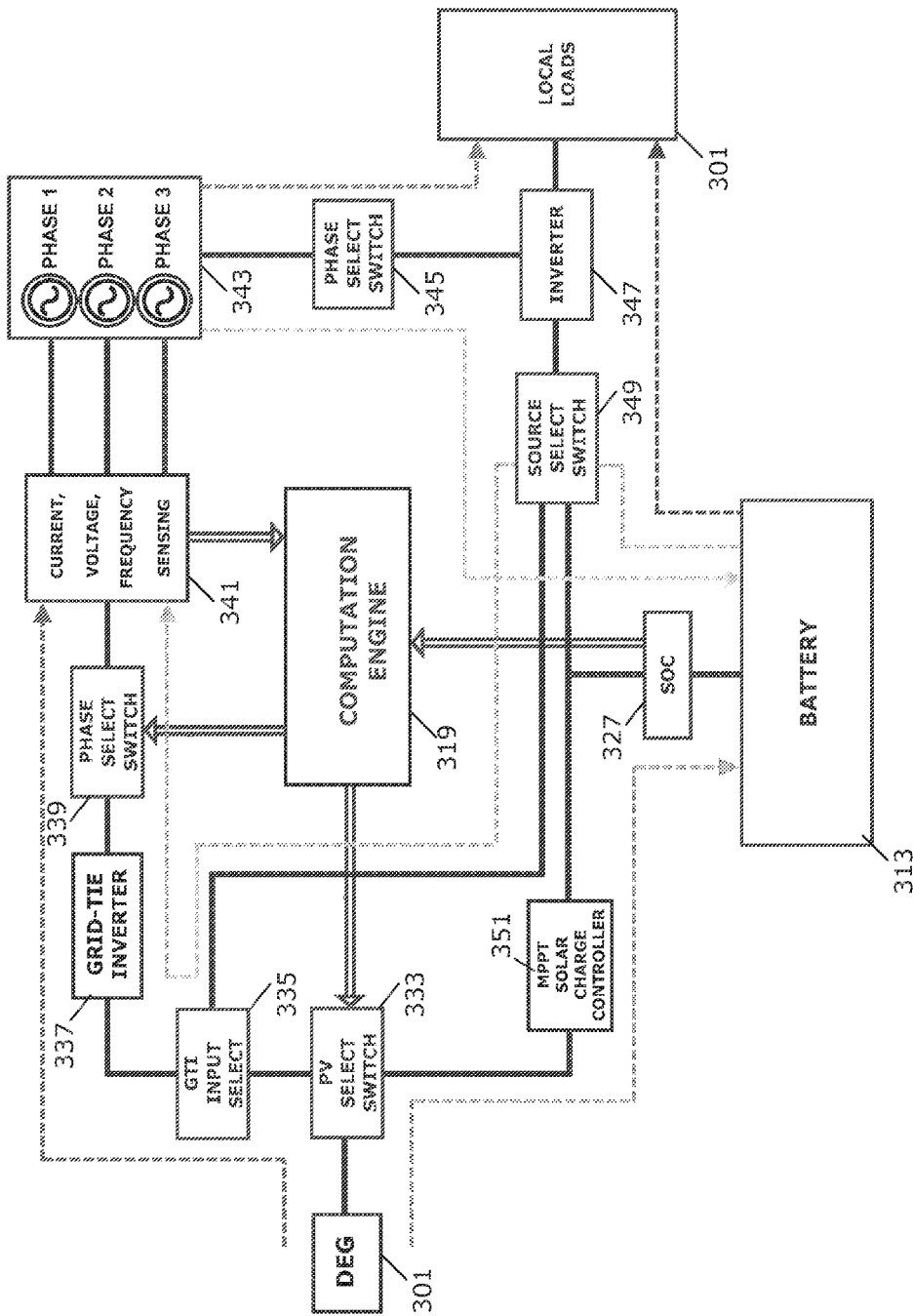
FIG. 3 schematically illustrates a variant system architecture.

FIG. 3 schematically illustrates a variant system architecture, in accordance with at least one embodiment of the invention. Here, distributed energy generation (DEG) 301 takes place via solar energy. Power flows are shown with solid lines, and the white arrows indicate data flows to and from computation engine 319, which can operate analogously to the regulator 119 described and illustrated with respect to FIG. 1 (and/or could form part of such a regulator). Dotted arrows indicate possible general energy flows, given the functioning of one or more switches.

As shown, in accordance with at least one embodiment of the invention, DEG 301 can feed a battery 313 and/or a three-phase grid 343. The grid 343 and battery 313, in turn, can feed local loads 301. Battery 313 and grid 343 may also feed each other.

In accordance with at least one embodiment of the invention, DEG 301 is in communication with a PV (photovoltaic cell) select switch 333, itself in communication with a grid-tie inverter (GTI) 337 via GTI input selector 335. Also connected to GTI inverter 337 is a phase select switch 339 in communication with grid 343. Another phase select switch 345 is in communication with an inverter 347, itself in communication with local loads 301. PV select switch 333 is also in communication with a MPPT (maximum power point tracking) solar charge controller 351. A source select switch 349 can be in communication with the latter, GTI input selector 335 and battery 313.

In accordance with at least one embodiment of the invention, a SoC sensor 327 senses battery 313 while current, voltage and frequency sensing 341 can be applied to grid 343. Data from sensor(s) 341 and SoC sensor 317 can feed computation engine 319 which, in essentially any suitable manner as broadly contemplated herein, controls PV select switch 333 and phase select switch 339.

Figure 4:
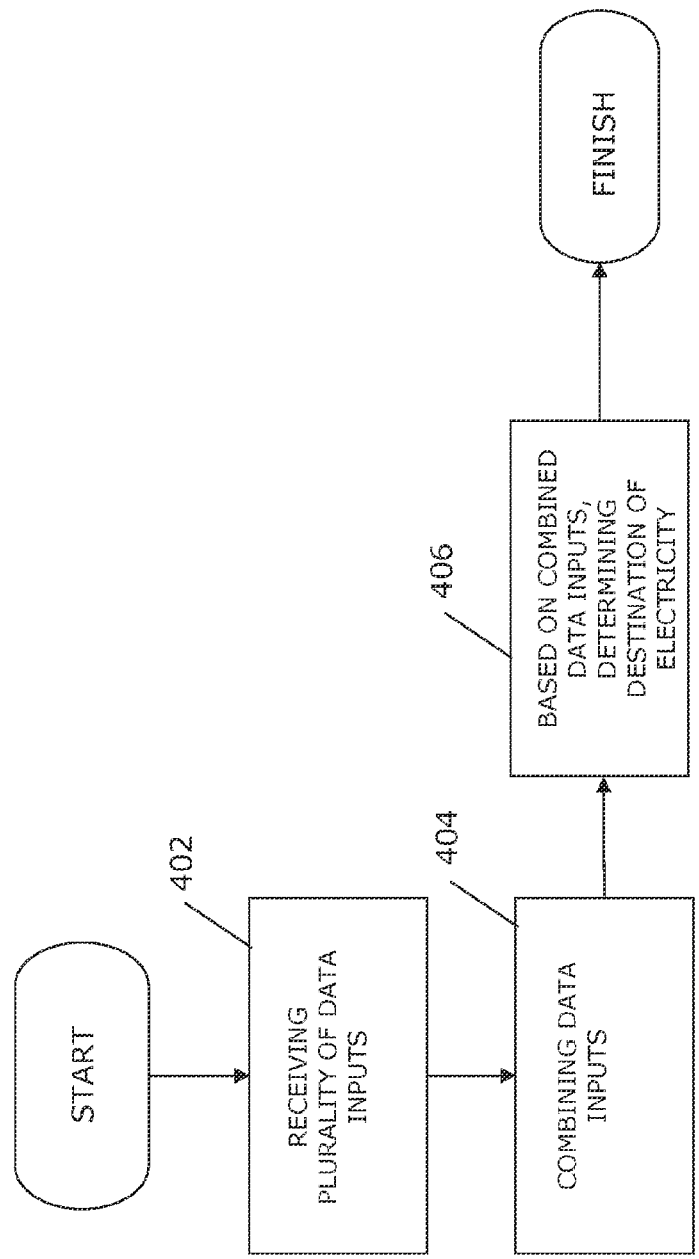
FIG. 4 sets forth a process more generally for managing electricity generation in a distributed electricity generation system.

FIG. 4 sets forth a process more generally for managing electricity generation in a distributed electricity generation system, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a plurality of data inputs are received (402) comprising: a sensed state of a power grid; a sensed state of local energy storage; and a sensed demand of a local electricity load. The data inputs are combined (404), and, based on the combined data inputs, there is determined a destination of electricity that is generated in the distributed electricity generation system (406). The at least one destination is selected from the group consisting of: a local electricity load, the power grid, and the local energy storage.

Figure 5:
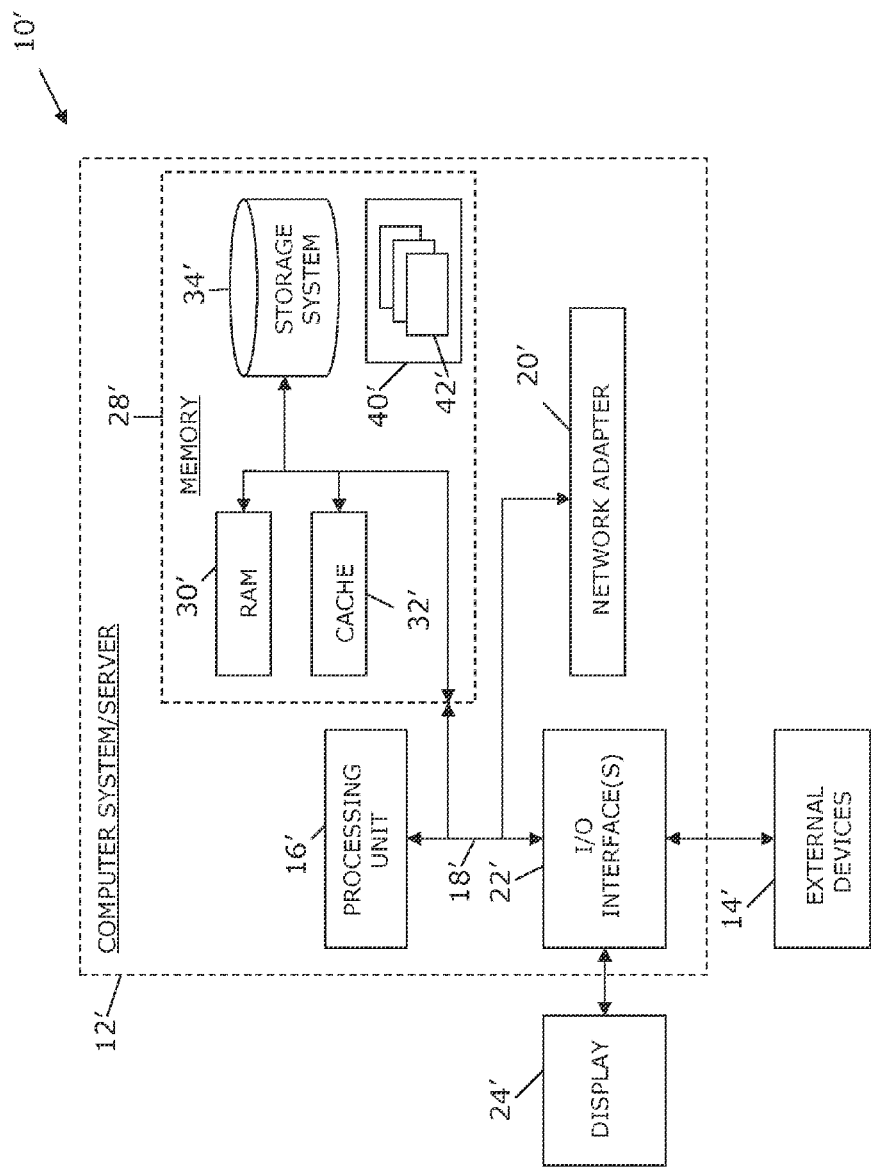
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. Alternatively or in addition, processing functions undertaken by node 10' could be hosted on a regulator such as that indicated at 119 in FIG. 1, e.g., by way of a micro-controller. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing electricity generation in a distributed electricity generation system, said method comprising:
utilizing at least one processor to execute computer code that performs the steps of:

receiving an indication of availability of electricity generated by a local entity in the distributed electricity generation system, wherein the local entity comprises a local generation source that injects electricity into a power grid system and a local power consumer;
receiving a plurality of data inputs comprising:
  a sensed state of a power grid, wherein the sensed state of the power grid is determined via measurement of line voltage;
  a sensed state of local energy storage, wherein the sensed state of local energy storage identifies a state of charge of the local energy storage; and
  a sensed demand of a local electricity load, wherein the sensed demand of a local electricity load indicates local energy requirements of the local entity;
combining the data inputs;
based on the combined data inputs, determining an optimal destination, from a plurality of destinations, for the electricity generated by the local generation source, wherein the optimal destination is determined based upon energy requirements of the plurality of destinations, energy availability of the plurality of destinations, and energy context information determined from the combined data inputs, wherein the energy context information comprises cost information associated with each of the plurality of destinations;
wherein the plurality of destinations comprise: the local electricity load, the power grid, and the local energy storage;
the determining an optimal destination comprising selecting, from one of the plurality of destinations, a destination having a requirement for the electricity generated and wherein the selected destination provides a cost-efficient destination for the electricity generated based upon the energy context information; and
injecting, based upon the determined optimal destination comprising the power grid, the electricity generated by the local generation source into the power grid, wherein the injecting comprises matching at least one phase of the power grid by determining the probability of injection into one phase by determining a grid load condition from the moving average of line voltage and comparing a normalized probability of injection to values of the phases.

2. The method according to claim 1, wherein said receiving takes place at a regulator of a local electricity network.

3. The method according to claim 1, wherein:
the local energy storage comprises a storage battery; and
the sensed state of local energy storage comprises a measured terminal voltage of the storage battery.

4. The method according to claim 3, wherein the sensed state of local energy storage comprises a sensed state of charge of the storage battery state, based on the measured storage battery terminal voltage.

5. The method according to claim 1, wherein the data inputs comprise electricity pricing information.

6. The method according to claim 5, wherein the pricing information includes at least one of: feed-in tariff information and time-of-use pricing.

7. The method according to claim 1, wherein the sensed state of the power grid includes at least one of: sensed grid frequency and sensed grid voltage.

8. The method according to claim 1, wherein the sensed state of the power grid includes both of: sensed grid frequency and sensed grid voltage.

9. The method according to claim 1, wherein the sensed state of the power grid includes grid line phase angle.

10. The method according to claim 1, wherein the inputs comprise a determined future need of at least one local load.

11. An apparatus for managing electricity generation in a distributed electricity generation system, said apparatus comprising:
at least one processor; and
a computer readable storage medium having computer readable program code embodied therewith and executable by the at least one processor, the computer readable program code comprising:
computer readable program code configured to receive an indication of availability of electricity generated by a local entity in the distributed electricity generation system, wherein the local entity comprises a local generation source that injects electricity into a power grid system and a local power consumer;
computer readable program code configured to receive a plurality of data inputs comprising:
  a sensed state of a power grid, wherein the sensed state of the power grid is determined via measurement of line voltage;
  a sensed state of local energy storage, wherein the sensed state of local energy storage identifies a state of charge of the local energy storage; and
  a sensed demand of a local electricity load, wherein the sensed demand of a local electricity load indicates local energy requirements of the local entity;
computer readable program code configured to combine the data inputs;
computer readable program code configured to, based on the combined data inputs, determine an optimal destination, from a plurality of destinations, for the electricity generated by the local generation source, wherein the optimal destination is determined based upon energy requirements of the plurality of destinations, energy availability of the plurality of destinations, and energy context information determined from the combined data inputs, wherein the energy context information comprises cost information associated with each of the plurality of destinations;
wherein the plurality of destinations comprise: the local electricity load, the power grid, and the local energy storage;
the determining an optimal destination comprising selecting, from one of the plurality of destinations, a destination having a requirement for the electricity generated and wherein the selected destination provides a cost-efficient destination for the electricity generated based upon the energy context information; and
computer readable program code configured to inject, based upon the determined optimal destination comprising the power grid, the electricity generated by the local generation source into the power grid, wherein the injecting comprises matching at least one phase of the power grid by determining the probability of injection into one phase by determining a grid load condition from the moving average of line voltage and comparing a normalized probability of injection to values of the phases.

12. A computer program product for managing electricity generation in a distributed electricity generation system, said computer program product comprising:
a computer readable storage medium having computer readable program code embodied therewith, the computer readable program code comprising:
computer readable program code configured to receive an indication of availability of electricity generated by a local entity in the distributed electricity generation system, wherein the local entity comprises a local generation source that injects electricity into a power grid system and a local power consumer;

computer readable program code configured to receive a plurality of data inputs comprising:
  a sensed state of a power grid, wherein the sensed state of the power grid is determined via measurement of line voltage;
  a sensed state of local energy storage, wherein the sensed state of local energy storage identifies a state of charge of the local energy storage; and
  a sensed demand of a local electricity load, wherein the sensed demand of a local electricity load indicates local energy requirements of the local entity;

computer readable program code configured to combine the data inputs;

computer readable program code configured to, based on the combined data inputs, determine an optimal destination, from a plurality of destinations, for the electricity generated by the local generation source, wherein the optimal destination is determined based upon energy requirements of the plurality of destinations, energy availability of the plurality of destinations, and energy context information determined from the combined data inputs, wherein the energy context information comprises cost information associated with each of the plurality of destinations;

wherein the plurality of destinations comprise: the local electricity load, the power grid, and the local energy storage;

the determining an optimal destination comprising selecting, from one of the plurality of destinations, a destination having a requirement for the electricity generated and wherein the selected destination provides a cost-efficient destination for the electricity generated based upon the energy context information; and computer readable program code configured to inject, based upon the determined optimal destination comprising the power grid, the electricity generated by the local generation source into the power grid, wherein the injecting comprises matching at least one phase of the power grid by determining the probability of injection into one phase by determining a grid load condition from the moving average of line voltage and comparing a normalized probability of injection to values of the phases.

13. The computer program product according to claim 12, wherein said receiving takes place at a regulator of a local electricity network.

14. The computer program product according to claim 12, wherein:
  the local energy storage comprises a storage battery; and
  the sensed state of local energy storage comprises a measured terminal voltage of the storage battery.

15. The computer program product according to claim 14, wherein the sensed state of local energy storage comprises a sensed state of charge of the storage battery state, based on the measured storage battery terminal voltage.

16. The computer program product according to claim 12, wherein the data inputs comprise electricity pricing information.

17. The computer program product according to claim 16, wherein the pricing information includes at least one of: feed-in tariff information and time-of-use pricing.

18. The computer program product according to claim 12, wherein the sensed state of the power grid includes at least one of: sensed grid frequency and sensed grid voltage.

19. The computer program product according to claim 12, wherein the sensed state of the power grid includes both of: sensed grid frequency and sensed grid voltage.

20. A method comprising:
  utilizing at least one processor to execute computer code that performs the steps of:
  receiving an indication of availability of electricity by a local entity in the distributed electricity generation system, wherein the local entity comprises a local generation source that injects electricity into a power grid system and a local power consumer;
  sensing (i) a state of a power grid determined via measurement of line voltage, (ii) a state of local energy storage identifying a state of charge of the local energy storage, (iii) demand of a local electricity load indicating local energy requirements of the local entity, and (iv) electricity pricing information;
  the sensed state of the power grid including at least one of: sensed grid frequency and sensed grid voltage;
  deriving data from said sensing of (i), (ii), (iii), (iv), and combining the derived data;
  receiving the derived data at a regulator of a local electricity network;
  based on the derived data, determining an optimal destination, from a plurality of destinations, for the electricity generated by the local generation source, wherein the optimal destination is determined based upon energy requirements of the plurality of destinations, energy availability of the plurality of destinations, and energy context information determined from the combined data inputs, wherein the energy context information comprises cost information associated with each of the plurality of destinations;
  wherein the plurality of destinations comprise: the local electricity load, the power grid, and the local energy storage;
  the determining an optimal destination comprising selecting, from one of the plurality of destinations, a destination having a requirement for the electricity generated and wherein the selected destination provides a cost-efficient destination for the electricity generated based upon the energy context information; and
  injecting, based upon the determined optimal destination comprising the power grid, the electricity generated by the local generation source into the power grid, wherein the comprises matching at least one phase of the power grid by determining the probability of injection into one phase by determining a grid load condition from the moving average of line voltage and comparing a normalized probability of injection to values of the phases.

* * * * *